United States Patent [19]

Berry et al.

[11] 4,383,271
[45] May 10, 1983

[54] THERMAL IMAGER

[75] Inventors: Charles A. Berry; Peter J. Berry; Ian H. Howie, all of Glasgow, Scotland

[73] Assignee: Barr & Stroud Limited, Glasgow, Scotland

[21] Appl. No.: 263,098

[22] Filed: May 12, 1981

[30] Foreign Application Priority Data

May 22, 1980 [GB] United Kingdom ............... 8017012

[51] Int. Cl.³ .............................................. H04N 7/18
[52] U.S. Cl. .................................... 358/113; 358/150; 358/209
[58] Field of Search ............... 358/113, 148, 150, 209; 250/334; 128/664

[56] References Cited

U.S. PATENT DOCUMENTS

| | | | |
|---|---|---|---|
| 3,751,586 | 8/1973 | Johansson | 358/113 |
| 3,812,483 | 5/1974 | Graves | 358/113 |
| 3,944,730 | 3/1976 | Dahlqvist | 358/113 |

FOREIGN PATENT DOCUMENTS

| | | | |
|---|---|---|---|
| 1273707 | 5/1972 | United Kingdom | 358/113 |
| 1444518 | 8/1976 | United Kingdom | 358/113 |

Primary Examiner—Howard Britton
Attorney, Agent, or Firm—Mason, Fenwick & Lawrence

[57] ABSTRACT

A thermal imager comprises a scanner (13), detector (14) with mount (14A) cooled substantially below ambient temperature, and which via a reflector (16) on the locus (15) along which an image of the detector (14) is effectively scanned provides a characteristic radiation feature to the detector (14) in superimposition with the scanned radiation from the scanner (13). The scanner (13) operates with less than 50% efficiency so that in the detector output signal the scene-derived waveform has a duration $T_1 < 50\%T$, where T is the period of the detector output signal. The characteristic radiation feature gives rise to a sync signal at the detector output and is located prior to and closely adjacent the scene-derived waveform at a time interval $T_2$ prior to the end thereof. This sync signal is detected by a recognition circuit (20) and activates a monostable forming part of a clock circuit (22) for a duration $T_3$ such that $T_2 < T_3 < 50\%T$. The clock circuit (22) controls the timing of signal processing circuitry (24) and a video output device (25) connected to the output of the detector (14).

2 Claims, 2 Drawing Figures

THERMAL IMAGER

This invention relates to thermal imagers.

In thermal imagers the scene from which the thermal infrared radiation emanates is scanned continuously by an optical scanner across a detector the output signal waveform of which is fed through signal processing circuitry to a video output device. The scanner scans two-dimensionally but the detector output signal is substantially continuous being composed of successive waveform portions arising from the time interval that the detector is effectively scanned across the interior of the imager housing and the time interval that the detector is effectively scanned across the scene. The detector output signal therefore has a periodical structure the period T being conveniently measured from the end of the waveform portion due to a first scan across the scene to the end of the waveform portion due to the next scan across the scene. The waveform portions due to the scene-derived information are also of constant duration $T_1$, the scan efficiency of the imager being the ratio $T_1$ to T.

In order to synchronise the operation of the signal processing circuitry with the detector it is customary to add a waveform of predetermined shape to the detector signal in a fixed position during each period T relative to the waveform portion due to the scene-derived information. This sync signal is then recognised by a recognition circuit and used to activate a monostable from which a clock signal for the signal processing circuitry is derived. In the known thermal imagers this sync signal is positioned immediately after the scene-derived information and this gives rise to a relatively complicated sync recognition circuit in order to ensure that any scene-derived information which has a waveform portion similar to that of the sync signal does not prematurely activate the monostable. Unfortunately, in practice, where such a waveform portion exists it is usually repeated in a substantial number of the successive scan lines (i.e. periods T) since it arises from the existence of a physical object of significant size in the scene being viewed. Thus the monostable and hence the clock signal becomes unsynchronised with the scene-derived information for a significant number of scan lines and valuable information is lost since the corresponding video picture becomes unintelligible.

It is an object of the present invention to provide an improved form of thermal imager.

According to the present invention there is provided a thermal imager wherein the detector output waveform has a period T, the scene-derived waveform has a duration $T_1$, where $T_1 < 50\%T$, the sync signal is located prior to and closely adjacent the scene-derived waveform, the duration from the sync signal to the end of the scene-derived waveform is $T_2$ and the monostable has a set time $T_3$ such that $T_2 < T_3 < 50\%T$.

With the arrangement of the present invention the monostable is set for a duration greater than $T_1$ but less than $50\%T$ so that even if the monostable is prematurely activated it will have reverted to its off condition prior to the sync signal during the next period T of the detector output signal so that correct synchronisation will then occur, resulting in only a single line of unintelligible video.

It will be noted that because the scan efficiency is less than 50% the waveform portion due to the detector being scanned across the interior of the imager housing has a duration greater than $T_1$ and during this period the detector output requires to be devoid of a waveform which could be recognised erroneously by the recognition circuit. This however is easily achieved since the interior of the imager housing is of a predetermined nature. The sync signal may conveniently be provided by a mirror within the imager housing and reflecting infrared radiation from the detector mount (which is cooled substantially below ambient temperature) back onto the detector.

An embodiment of the present invention will now be described by way of example with reference to the accompanying drawing in which.

Figure 1:
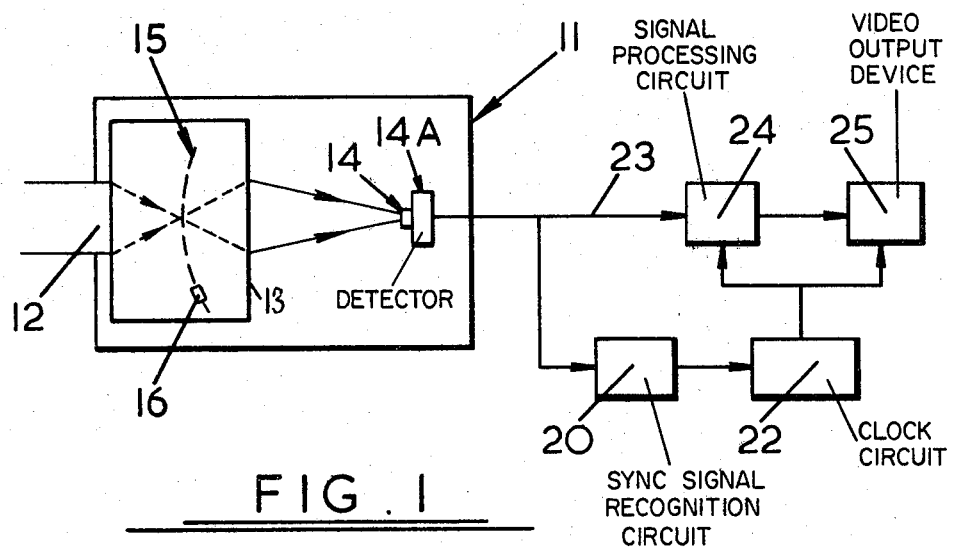
FIG. 1 shows a thermal imager in block form.

The drawing illustrates in FIG. 1 a thermal imager 10 comprising a housing 11 having a window 12 through which thermal infrared radiation from the scene is incident on a scanner 13. The scanner 13 focusses this radiation on a detector 14 resulting in an image of the detector 14 effectively being scanned along a line locus 15 within the housing 11 on which lies a mirror 16 for providing a sync signal by the narcissus effect from the mount 14A of detector 14 since the latter is cooled substantially below ambient. Any alternative known form of arrangement for providing such a sync signal would suffice however. The detector output is fed along signal path 18 to a sync signal recognition circuit 20 which extracts the sync signal and uses the extracted sync signal to activate a monostable forming part of a clock arrangement 22. The detector output signal is also fed along path 23 to the signal processing circuitry 24 and hence to the video output device 25 both of which are clocked by clock arrangement 22 for synchronisation.

Figure 2:
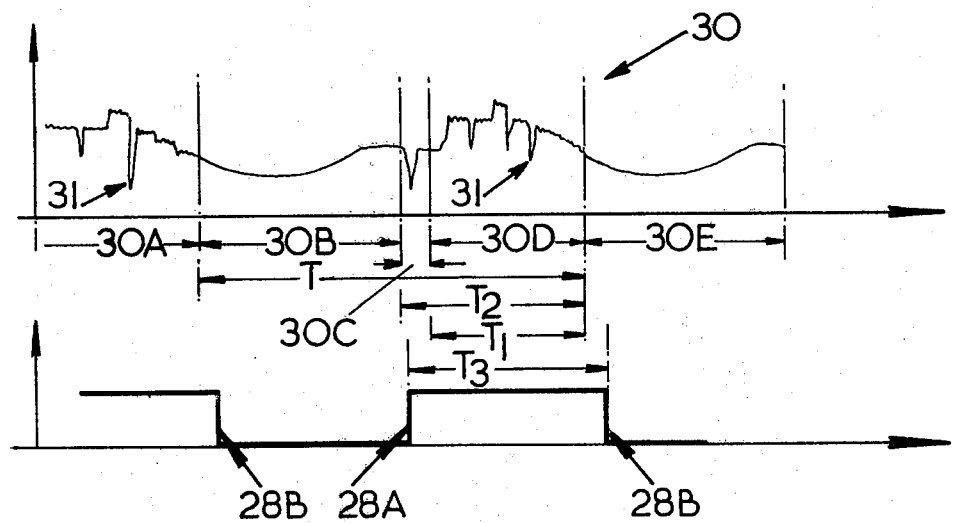
FIG. 2 illustrates the waveforms therefrom.

The form of the detector output signal 30 is illustrated in FIG. 2, being formed of successive waveform portions 30A, 30B, 30C, 30D and 30E. Portion 30A is representative of a first scan line containing scene-derived information; 30B represents the waveform due to the interior of the housing 11; 30C is the sync signal; 30D is a second scan line having a similar but not-necessarily identical waveform to portion 30A; and 30E is the same as 30B. It will be evident that the function of portions 30A and 30B represents the beginning of a period T terminating at the junction of portions 30D and 30E when the next period commences. Portion 30D is of duration $T_1$ such that $T_1 < 50\%T$ and the sync signal is located closely adjacent and prior to the portion 30D. The duration $T_2$ from the junction of portions 30B and 30C to the end of the period T is also less than $50\%T$.

The sync signal recognition circuit 20, which conveniently may comprise a differentiator and threshold device recognises the presence of the sync signal portion 30C and sets the monostable of the clock arrangement 22 for a time interval $T_3$ such that $T_2 < T_3 < 50\%T$ as shown in FIG. 2, the leading edge 28A of the monostable set portion being aligned in time with the sync signal and the trailing edge 28B of the monostable set portion being after the termination of $T_1$ and $T_2$ and T.

It will be noted that waveform portions 30B and 30E are devoid of anything resembling the sync signal portion 30C whereas portions 30A and 30D, being scene-derived information contain peaks such as 31 which in the absence of the present invention could lead to erroneous operation of the sync-signal recognition circuit 20.

What is claimed is:

1. A thermal imager comprising an optical scanner for receiving thermal infrared radiation from a field of view, a radiation detector for receiving the scanned radiation from the scanner, means for applying a characteristic radiation feature to the detector in superimposition with the scanned radiation from the scanner, signal processing circuitry connected in parallel with a sync signal recognition circuit to receive the detector output signal, a video output device connected to the output of said signal processing circuitry and clock means for timing the operation of said signal processing circuitry and said video output device, said clock means being controlled by the output of said sync signal recognition circuit, and wherein the scanner is arranged to provide the detector output waveform with a period $T$ each such period $T$ containing a scene-derived waveform of duration $T_1$ such that $T_1 < 50\%T$ and otherwise being devoid of a waveform which could be recognised erroneously by said recognition circuit, the characteristic radiation feature applying means is arranged to locate the resultant sync signal in the detector output waveform prior to and closely adjacent the scene-derived waveform at a time interval $T_2$ prior to the end of the scene-derived waveform, and the clock means comprises a monostable which is set by the sync signal recognition circuit for a duration $T_3$ such that $T_2 < T_3 < 50\%T$.

2. A thermal imager as claimed in claim 1, wherein said characteristic radiation feature applying means comprises a mirror located on the locus along which the detector image is effectively scanned by the scanner and arranged to reflect the radiation from the detector mount which is substantially below ambient temperature back onto the detector.

* * * * *